Oct. 22, 1957   A. L. IMSHAUG   2,810,204
COLOR PLATE REGISTER GAUGE DEVICE
Filed Feb. 8, 1954   2 Sheets-Sheet 1

INVENTOR
ARNOLD L. IMSHAUG.
BY
Chapin + Neal
ATTORNEYS

Oct. 22, 1957   A. L. IMSHAUG   2,810,204
COLOR PLATE REGISTER GAUGE DEVICE
Filed Feb. 8, 1954   2 Sheets-Sheet 2
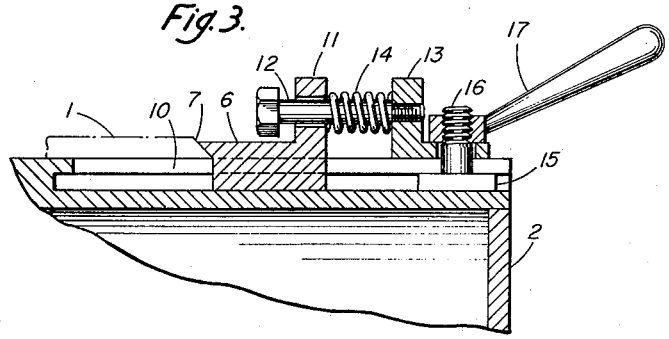
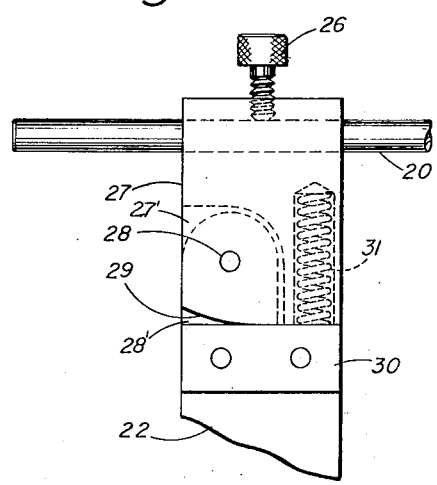
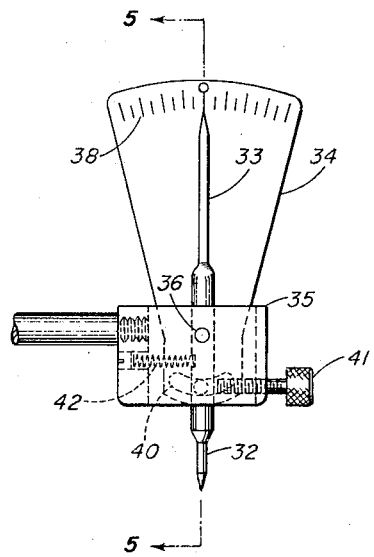
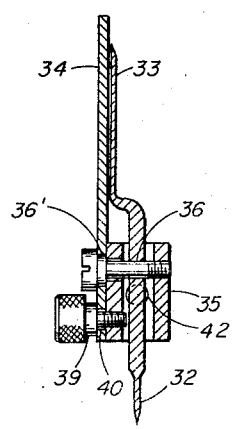
INVENTOR
ARNOLD L. IMSHAUG.
BY
Chapin & Neal
ATTORNEYS

United States Patent Office 2,810,204
Patented Oct. 22, 1957

2,810,204

COLOR PLATE REGISTER GAUGE DEVICE

Arnold L. Imshaug, West Springfield, Mass.

Application February 8, 1954, Serial No. 408,804

4 Claims. (Cl. 33—184.5)

This invention relates to gauge devices for checking the accuracy of curved color printing plates for insuring the accuracy of registration thereof before they are locked in the printing press cylinders.

An object of the invention is to provide a simple speedily operated device by which a plurality of curved color plates, each designed to impart a particular color on a single printed page, may be checked for accurate registration of the impression to be transferred to the printed page in the color printing sequence.

In printing copy in color a first plate is made up which is generally a "black and white" plate provided with spaces or black outlines defining the areas in which colors are to be printed. As many other plates as the number of colors may require are also made up to print the desired finished format. Obviously the plates subsequently impressing the several colors must be in accurate register with each other and with the first plate. The device of this invention is designed to provide a preliminary check on the accuracy of type registration of each color plate intended for such colored pages.

The above and other objects and advantages of the invention will be disclosed by the following description of an embodiment thereof as shown by the accompanying drawings, in which, Fig. 1 is a top plan view of a device incorporating the features of this invention;

Fig. 3 is an enlarged fragmentary detail view on line 3—3 of Fig. 1 to show spring holding clamp construction;

Fig. 4 is an enlarged fragmentary detail showing a bracket and arm connection for swinging the gauge indicators to and from operative position;

Fig. 5 is an enlarged vertical sectional view (as on line 5—5 of Fig. 6) of a comparator indicating gauge device for registration with the desired type reference points on the plates being checked; and Fig. 6 is an enlarged front elevational view of the gauge device shown in the assembly of Figs. 1 and 2.

As above mentioned the device of this invention is designed to test the accuracy of register of curved printing plates by checking such plates before mounting and installing the same on the printing press cylinders. The device with a curved plate 1 mounted thereon is shown in top plan by Fig. 1 and comprises a cylindrical drum 2 having an arcuate surface with a radius of curvature identical with that of the printing press cylinder on which the plates are to be mounted for printing operations. The drum 2 is fixed on an axial supporting shaft 3 which may be suitably fitted in mounting strands or brackets indicated at 4.

Figure 2:
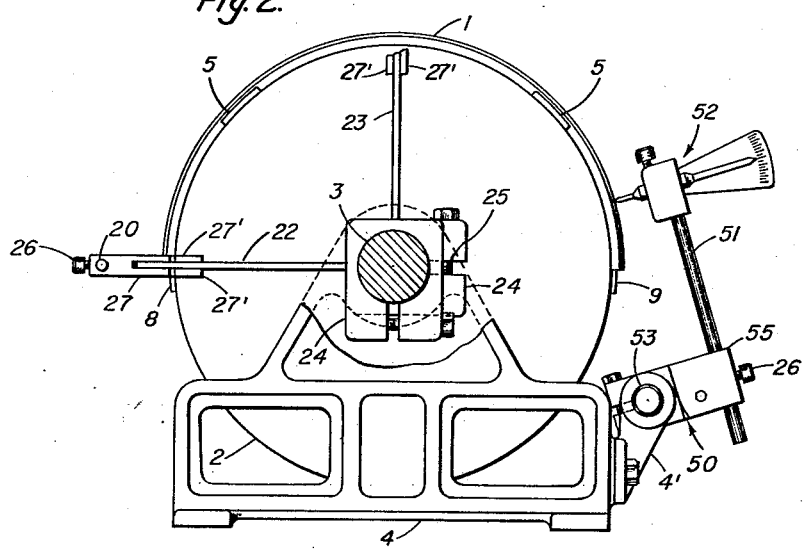
Fig. 2 is an end view of the same with parts cut away.

The drum 2 as illustrated is cylindrical, simulating a press cylinder but may if desired be semi-cylindrical inasmuch as the top surface of the drum only is utilized for checking the accuracy of a plate. A curved plate 1 after being made up is first checked by any suitable measuring instruments for accuracy as to linear dimensions to insure its correctness for proper registration in the locking clamps of the press cylinder on which it is to be mounted. The plate is then placed on the drum 2, being clamped in position between spaced stationary clamps 5 and a spring clamp 6, engaging the opposite sides of the plate. The beveled edges at 7 of the plate are held at each side under the complementary beveled undercut of the engaging edges of the clamps 5 and 6. Referring to Fig. 2 it will be seen that a head end abutment 8 and a tail end abutment 9 hold the head and tail ends of the plate for correct horizontal or endwise positioning on the drum.

The spring clamp 6 is slidably mounted in a T-slot 10 formed in the drum surface and extending parallel to the drum axis from the edge thereof towards the opposite side in an intermediate position between the stationary clamps 5. The clamp (Fig. 3) has a rear upwardly extended flange 11 through which a headed pin 12 extends from a flanged bracket 13 in which the pin is set. A spring 14 surrounding the pin between the flanges urges the clamp 6 inwardly to grip the adjacent side of the plate and push the plate to seating position against the clamps 5. The bracket 13 is movable along the T-slot 10 being connected with a key block 15 riding in the slot and threaded on the end of tightener screw 16 mounted in the bracket. By turning the handle 17, the screw 16 and the key 15 may be drawn upwardly to grip and anchor the bracket in any position along the slot 10. Thus with the bracket 13 located as desired a plate may be mounted on the drum by manually pushing clamp 6 against the spring 14, the opposite plate edge being inserted under the clamps 5 and quickly located in its holding position for checking purposes.

The indicators for checking the accuracy of the type in respect of their lateral relationship on a plate are mounted on swinging arms 20 and 21 extending axially of the drum and adjustably fitted on brackets 22 and 23 respectively. Each of the brackets is rotatably mounted on the support shaft 3 preferably at the same end thereof. The brackets may be mounted on the shaft, as shown, by split bearing blocks 24 with spaced ears joined by clamping screws at 25 for adjustably clamping the brackets in the desired rotative position on the shaft. The brackets extend radially of the shaft and the arms 20 and 21 overlie the drum, being in operative position at right angles to the brackets.

Each arm is slidable in the outer end assembly of its associated bracket and adjustably held by a set screw as at 26 (see Fig. 4) in a pivoted member 27 carried at the outer end of the bracket. The member 27 has forked legs 27' with a pin at 28 extending therethrough and through an extension 28' of the bracket for rocking the member 27 and carrying the arm upwardly away from the drum surface. As indicated by Fig. 4 the legs 27' are relieved at 29 to permit limited pivotal movement of the member until the surfaces at 29 rest against abutment straps 30 mounted at each side of the bracket. This position is shown in dotted line in Fig. 1. The straps 30 also provide a lower seat for a compression spring 31 held in a socket provided in member 27 forwardly of the extension 28'. The springs thus normally urge the member 27 in a counterclockwise direction as in Fig. 1 to carry the arm upwardly. The arms 20 and 21 of Fig. 1 are herein shown in operative "check" position.

Carried on the outer end of each arm 20 and 21 are comparator gauge devices having registering fingers 32 and indicator pointers 33 with dial plates 34 for determining the accuracy of the type registration of the color plates.

Figure 1:
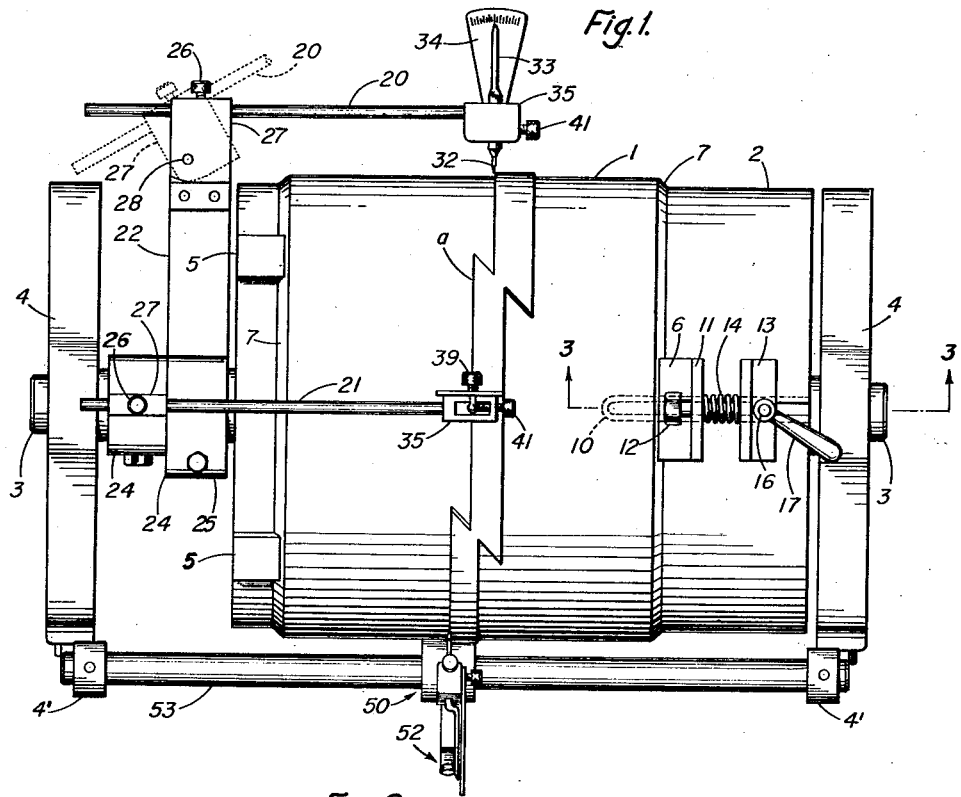

The gauge device shown by Fig. 1 at the ends of arms 20 and 21 and in further detail by the vertical section of Fig. 5 indicates on the dial the amount of variation in register of the type of one color plate from the type of a color plate previously mounted on the drum. In practice a first plate as a "black and white" plate is positioned on the drum and the arms 20 and 21 are set by adjustment of the brackets and arms for the approximate registration of finger 32 at a desired reference point. For purposes of illustration such reference point might be at the left-hand boundary line of a band "a" on the plate of Fig. 1. Assuming further that the band is to appear in print ultimately with a red color having a black rim and against a blue background, it will be realized that the plate depicted by Fig. 1 is the red color plate. It will also be appreciated that the first plate which will impart a black bordering rim for the band is initially placed on the drum to "set" the gauge for checking the accuracy of the subsequent red and blue plates. The gauge is set by manipulating the bracket position and extension of the arm and these are fixed with the finger 32 registering with the black type boundary line as at the left with reference to Fig. 1 and the dial indicator pointing to a zero designation preferably in the center of the dial indicator. It will thus be realized that when the red color plate as the plate 1 in Fig. 1 is located on the drum the finger should rest against the left hand edge of the "red" band "a" with the pointer at zero to indicate proper registration of the two plates. When the blue background color plate is subsequently located on the drum the dial should then indicate a zero reading with the finger registered at the inner edge of the adjacent background color type. Should the type on either the red or blue color plate be out of registration the finger may be manipulated to indicate the degree to which such plate is off register. According to the nature of the plate and the amount of variation from registration the operator can then determine whether it will be feasible to install the plate on the cylinder and by appropriate manipulation of its positioning therein compensate for the error in registration or whether it is advisable to remake the plate.

The gauge device as will appear from the details of Figs. 5 and 6 is provided with a block 35 in which the registering member is pivoted at 36 forming at its lower end the finger 32 and at its upper offset end the pointer 33. The dial face plate 34 with indicia 38 is pivoted on the shoulder 36' of the pivot pin 36 (Fig. 5) against the rear face of the block 35. A shouldered clamp screw 39 is threaded into the block 35 through a slot 40 in the dial plate 34 to permit the adjustment of the pivotal position of the dial face with respect to the pointer 33 and to register the zero reading with the tip of the pointer 33 when the finger 32 is adjusted to register with the desired type point on a color plate 1. The slot 40 is arcuate (Fig. 6) and the dial 34 is swung on its pivot 36 as desired being clamped by tightening the clamp screw 39.

An adjusting screw 41 (Fig. 6) below the pivot pin 36 is threaded into the side of the block against the stem of the finger 32. The stem is oppositely urged by a spring 42. Thus by turning screw 41 the finger may be moved into exact registration at the point desired after the arm 20 or 21 is fastened in an approximate position of register. Thus the finger may be initially "pin-pointed" before swinging the dial face to show a zero reading. It will be appreciated that the finger will be approximately positioned in adjusting the arm 20 or 21 and that the adjusting screw 41 will require very little movement for the finer adjustment and adequate registration of the finger 32. Thus in registering the zero reading by swinging the dial face sufficient swinging movement will remain for the manipulation of the screw 41 to move finger to either side of the zero reading when computing the amount of lateral variation in a plate which is off registration to one side or the other of the finger. Thus a reading may be taken from the dial indicia as to the degree of variation and corrective steps taken as indicated with respect to the mounting of the plate.

In Figs. 1 and 2 the brackets 22 and 23 are shown in position to test the accuracy of the plates at the head end and centrally thereof respectively. The brackets, of course, may be adjusted on the shaft 3 to check the accuracy of the plate at any desired position laterally of the plate, i. e. axially of the drum and plate. In general the bracket 22 will be used for checking type at the head end half section of the plate and the bracket 23 the tail end section thereof.

For checking the accuracy of the type from a position horizontally or endwise of the plate 1, a bracket 50 comprising a split clamp with a swing arm 51 and gauge device 52 is adjustably fixed on a shaft 53 parallel to shaft 3. Shaft 53 is fixed between the end support brackets 4, the latter being provided with bracket extensions 4' to carry the shaft 53. The split clamp bracket 50 is formed with a spring loaded forked and pivotally mounted member 55 similar to the members 27 of the brackets 22 and 23 so as to normally swing the arm 51 and gauge 52 to a position spaced from the surface of the drum. Thus with the arms 51, 20 and 21 in upraised normal position a plate will be afforded ample clearance for mounting the same on the drum.

In operation it will be seen that the gauges at the ends of the several arms are each manually swung against the spring pressure of the bracket mountings and onto the plate surface at the several points desired. The gauges are then each set to register the fingers at suitable reference points on the plates. When the arms are set and swung to inoperative position the first plate is removed and as many color plates as are to be used are successively placed on the drum to check the accuracy thereof in relation to the first plate and to each other. In each checking operation the operator simply presses the arm down towards a plate to note any error and the amount thereof if the type should be off register. Thus the individual plates may be corrected as indicated and placed in the press with assurance of correct registration on the color page to be printed.

I claim:

1. Apparatus for checking the accuracy of type registration of a plurality of curved color printing press plates comprising a drum having abutment clamping means to hold said plates successively in the same position on said drum, said drum having an axial supporting shaft extending outwardly at one end of the drum, a radially extending bracket rotatably mounted on the drum shaft and means to make said bracket fast on said shaft in any adjusted position, a member carried by said bracket outwardly adjacent the edge of said drum and slidably mounted therein for movement axially of the drum, a comparator gauge device including an indexing finger extending towards the drum surface on the end of said member, means to fix said member in said bracket, said bracket having means to pivot said member on the bracket in a direction to carry said member to a position upwardly of the drum surface, and spring means normally urging said member to its upward pivotal position, said indexing finger being adjustable to fix the same against a selected reference point on the type of the curved plate inserted into position on said drum.

2. Apparatus for determining the accuracy of printing registration of a plurality of curved color printing plates comprising in combination, a drum with abutment clamping means to hold said plates successively in the same position on said drum, bracket means including a support member extending radially of the drum and mounted for rotation about the drum axis, and, at the outer end of the support member having a transversely mounted extension with a comparator gauge device carried thereby, said extension being pivotally mounted relative to the support member for swinging the gauge toward and away from the type surface of a plate positioned on said drum, said gauge including an adjustable indexing finger to provide an adjustable reference element to fix said finger with relation to a selected point on the type of a plate on said drum, said gauge carrying extension being slidably supported relative to said support member for fixing the extension of said gauge with relation to the surface of said plate, and means to pivotally carry said extension outwardly of said drum, a second bracket with pivoting means supporting a similar gauge device and including a gauge supporting member slidably extendible across said plate in a direction transversely of the path of the said extension of the first bracket and for checking plate type from a direction extending angularly with relation to said first mentioned gauge supporting extension.

3. Apparatus for determining the accuracy of printing registration of a plurality of curved color printing plates and comprising in combination a cylindrical drum having an axial supporting shaft and also having abutment clamping means to hold printing plates thereon in the same relative position against the cylindrical surface thereof, a bracket rotatably mounted on said shaft with means to fix said bracket relative to the shaft, said bracket extending radially of said drum at one end thereof and having outwardly adjacent the drum edge a member pivotally mounted for limited rocking movement about an axis transverse to the axis of the drum, an arm carried by said member and adjustably fixed for extension axially of said drum in a path overlying the outer drum surface, said rocking member being spring urged to carry said arm upwardly with respect to said drum surface, an adjustable comparator gauge mounted on said member and provided with an indexing finger directed towards the drum surface for fixing said finger relative to a selected reference point on the type of a printing plate surface, a bracket shaft parallel to said drum support shaft having a bracket rotatably and slidably mounted thereon with means to clamp said bracket thereto, said latter bracket having a member mounted for limited pivotal movement about an axis parallel to said drum axis and an arm extendible from said member to overlie said plate surface in a direction transversely of said drum axis, and a comparator gauge having an indexing finger mounted on said latter arm for checking the registration of plate type from a direction angularly disposed with relation to the extension of said first mentioned gauge.

4. Apparatus for checking the accuracy of curved printing plates and particularly the registration of printing portions of a plurality of plates as are used in colored printing, said apparatus comprising means for successively supporting such plates, means for clamping each plate in the same location on said supporting means, gauging means, means for mounting said gauge means at one curved side of a clamped plate, said gauge mounting means being swingable about the axis of the clamped plate, said gauge mounting means further comprising an arm which overlies the clamped plate and on which the gauge means is secured in such overlying relation, said arm being pivotally mounted at a point removed from said clamped plate for swinging movement towards and away from said plate, and spring means continuously urging the arm and with it the gauge means away from said plate.

References Cited in the file of this patent

UNITED STATES PATENTS

| | | |
|---|---|---|
| 983,648 | Royle | Feb. 7, 1911 |
| 1,067,067 | Schlueter et al. | July 8, 1913 |
| 2,321,228 | McMullen | June 8, 1943 |
| 2,337,697 | Varney | Dec. 28, 1943 |
| 2,455,076 | Magaelson | Nov. 30, 1948 |
| 2,559,533 | Daniels | July 3, 1951 |
| 2,668,363 | Lippitt | Feb. 9, 1954 |